Patented July 30, 1935

2,009,454

UNITED STATES PATENT OFFICE 2,009,454

DEWAXING OF HYDROCARBONS

Hans Ramser, Berlin-Steglitz, Germany, assignor to firm Edeleanu Gesellschaft m. b. H., Berlin, Germany, a German company No Drawing. Application October 31, 1931, Serial No. 572,437. In Germany November 4, 1930

11 Claims. (Cl. 196—19)

This invention relates to an improvement in the art of dewaxing hydrocarbon oils, whereby the paraffin is eliminated and the pour point of the oil product is very considerably lowered.

More specifically, the improvement is in the method commonly employed which consists in adding a diluent, chilling, removing the paraffin or wax by mechanical or other means and, finally, removing the diluent.

The diluents which have been used have been neutral organic solvents such as alcohol, benzine, kerosene, naptha, acetone, butanol and benzol. However, these solvents led to a better separation only in a few cases and their application has the disadvantage that these solvents dissolve a certain quantity of the paraffin and so do not permit of as complete a wax separation as might be desired. Also, liquid $SO_2$ has recently been proposed as a diluent, but is not entirely satisfactory in practice.

According to the present invention, the dewaxing is attained by diluting the oil to be dewaxed with a low boiling point halogen derivative of an aliphatic (acyclic) hydrocarbon, such as methyl chloride, ethyl chloride or dichlorodifluoromethane; under pressure at least sufficient to maintain the desired amount of diluent in liquid phase. The mixture is then chilled and the waxes or paraffins removed, preferably by filter pressing, centrifuging, or other mechanical means. Finally, the diluent is removed by evaporation and re-used.

The advantage of these solvents consists in the fact that they reduce to a very high degree the viscosity of the hydrocarbons to be treated. The diluents are soluble in hydrocarbon oils in any proportion. The solutions thus obtained may be very strongly cooled without affecting the separation of the precipitated paraffins in the filter press or the centrifuge. Another advantage of the diluents is that their solution power towards paraffin is only very small. Furthermore—on account of their low boiling points—they are easily recovered from the dewaxed oil and reentered into the cycle of the process. Another advantage is that the diluents possess a higher specific gravity than the paraffins to be eliminated, whereby for instance the centrifuging is rendered easier and speedier. And of course the low viscosity makes for higher mechanical efficiency in general since the oil will flow readily through all the parts of the apparatus.

Due to their low boiling points and consequent marked tendency to vaporize, the above mentioned solvents are well suited for use as direct cooling means for the oils to be dewaxed. That is, the solvents can be employed to both dilute and chill the oils, thus simplifying the process by making unnecessary the use of external cooling means such as ammonia refrigeration.

As methyl chloride boils at about —24° C. and dichlorodifluoro-methane boils at about —30° C., it is obvious that when either of these liquids is used as the diluent it is necessary to maintain the oil mixture under sufficient pressure to prevent further vaporization of the diluent after the temperature has been reduced to that desired for the dewaxing treatment. The same pressure conditions will apply to the use of any other diluent having a boiling point lower than the temperature desired for the dewaxing treatment.

No claim is made to any apparatus involved, as the mechanical elements required for carrying out the process are well known.

The diluents disclosed may be used in any particular embodiment of the general dewaxing method herein set forth which is known to the art and it is not intended to restrict their use to any one of such.

Example I 67 parts of an American paraffin distillate of specific gravity 0.857 and a pour point of +1° C. are mixed with 33 parts of ethyl chloride and 5% clay, cooled down to approximately —30° C. and pressed at this temperature in a filter-press. The rate of filtration may be called "good" and the resulting oil has a pour point of about —30° C.

Example II

A Midcontinent residue, specific gravity 0.937, pour point +39° C., mixed with 10% clay, cannot be pressed any longer if a cooling to +3° C., is effected. However, if about 30% by volume of ethyl chloride is added to the above mentioned mixture, the cooled mixture can be very well filter-pressed at +3° C. and the dewaxed oil will have a pour point of +1° C. The same mixture may be further cooled to about —10° C. At this temperature filtration may be easily accomplished and the resulting oil will have a pour point of —10° C.

In the above mentioned examples, ethyl chloride may be replaced by methyl chloride without essential changes as to the results obtained. Good results may be also obtained by replacing a part of the halogen containing solvents with the previously used solvents such as benzene or liquid sulphur dioxide. The decrease in viscosity is also in this case quite considerable, whereby a good rate of filtration in the press or in the centrifuges is assured.

Example III

This and the next example illustrate the use of methyl chloride for dewaxing.

A mixed-base wax-bearing lubricating oil of Midcontinent origin, with a pour point of 110° F., was mixed with 2.5 volumes of liquid methylchloride at room temperature. The mixture was heated to 115° F., in a pressure vessel, in order to completely dissolve the wax. Then the solution was chilled to −15° F., by indirect cooling. During the chilling the mixture was continuously stirred by a scraper stirrer in order to prevent the wax from crystallizing out on the walls of the chilling vessel. The chilled mixture was filtered through an ordinary type of filter press at −15° F., under a pressure of about 2 pounds per square inch. The filtered oil was freed of methylchloride by evaporation. The properties of the oil before and after dewaxing were as follows:

|  | Before dewaxing | After dewaxing |
|---|---|---|
| ° A. P. I. | 24.4 | 23.2 |
| Viscosity at 210° F. | 61 | 65 |
| Viscosity gravity constant | 0.843 | 0.851 |
| Pour point ° F. | 110 | −10 |

Example IV

A mixed-base wax-bearing cylinder stock of Midcontinent origin, with a pour point of 110° F., was completely dissolved in 2.5 volumes of liquid methylchloride at 120° F., in a pressure vessel under 130 pounds per square inch pressure. An amount of liquid methylchloride sufficient to chill the solution to −15° F. by evaporation was added and allowed to evaporate under reduced pressure until the temperature of the mixture was reduced to −15° F. The mixture was then filtered at −15° F. in an ordinary type filter press under a pressure of about 2 pounds per square inch. The filtered oil was then freed of methylchloride by evaporation, and its properties were as follows, compared with undewaxed oil:

|  | Before dewaxing | After dewaxing |
|---|---|---|
| ° A. P. I. | 22.1 | 20.8 |
| Viscosity at 210° F. | 152 | 177 |
| V. G. C. | 0.841 | 0.850 |
| Wax content, weight % | 10 | 0 |

Example V

This example illustrates the use of dichlorodifluoromethane for dewaxing.

The same oil referred to in Example III was mixed in a pressure vessel with 2.5 volumes of liquid dichlorodifluoromethane, at room temperature. The mixture was heated under pressure to 115° F. in order to completely dissolve the wax, and the solution was then chilled to −19° F. by direct cooling, by applying suction to the vessel to reduce the pressure and cause evaporation of the solvent. The amount of dichlorodifluoromethane thus evaporated was continuously replaced by introducing additional amounts of the liquid solvent so as to keep constant the amount of liquid in the vessel. Then the mixture was filtered at −19° F. in an ordinary type filter press under a pressure of about two pounds per square inch. After the filtered and dewaxed oil had been freed of the solvent, by evaporation, it had the following properties in comparison with those of the initial undewaxed oil.

|  | Before dewaxing | After dewaxing |
|---|---|---|
| ° A. P. I. | 24.4 | 23.1 |
| Viscosity at 210° F. | 61 | 65 |
| V. G. C. | 0.843 | 0.852 |
| Pour point ° F. | 110 | −15 |

In the claims it will be understood that by "low boiling" diluents are meant those which boil at sufficiently low temperatures to permit of ready separation from the wax-free oil product by evaporation, that is, whose boiling points are similar to those of the specifically named diluents; and that "chilling" is a relative term depending upon the oil mixture used and the products desired. Also the words "diluent", "diluting" and "dilution" as used in the claims, unless otherwise stated therein, are non-exclusive, that is, these words are intended to include partial as well as complete dilution by means of the diluent named, and not to exclude the use of other diluents.

Having described my invention, what I claim is:

1. An improvement in the process of dewaxing hydrocarbon oils by dilution, chilling, removal of waxes and subsequent freeing of the oil from the diluent, which improvement consists in the use of a low-boiling halogen derivative of methane as a diluent.

2. An improvement in the process of dewaxing hydrocarbon oils by dilution, chilling, removal of the waxes and freeing of the oil from the diluent, which improvement consists in the exclusive use of one or more low-boiling halogen derivatives of methane to effect the dilution desired.

3. The process of dewaxing a viscous mineral oil comprising diluting said oil under pressure with a solvent selected from the class consisting of the low-boiling chlorine and fluorine derivatives of methane, cooling the solution to a low temperature at which the wax is substantially all crystallized from the solution, separating the wax from the oil and solvent, and subsequently recovering the remaining solvents from the oil.

4. The process of dewaxing a mineral lubricating oil comprising diluting the oil under pressure with a diluent containing methyl chloride, cooling the diluted oil, thus causing the wax to separate from the diluted oil, and subsequently separating the wax from the oil.

5. The process of dewaxing a mineral lubricating oil comprising diluting the oil under pressure with a diluent containing dichloro-difluoromethane, cooling the diluted oil, thus causing the wax to separate from the diluted oil, and subsequently separating the wax from the oil.

6. The process of dewaxing a viscous mineral oil comprising diluting said oil with a diluent selected from the class consisting of the low-boiling chlorine and fluorine derivatives of methane, said dilution being effected under pressure sufficient to maintain the diluent in liquid phase, chilling the diluted oil to a dewaxing temperature whereby the wax is substantially all crystallized from the diluted oil, separating said wax from said diluted oil, and subsequently separating the remaining diluent from the oil.

7. The process of dewaxing a viscous mineral oil comprising diluting the oil with a diluent containing a substance selected from the class consisting of the low-boiling chlorine and fluorine derivatives of methane, said dilution being effected under pressure sufficient to maintain the diluent in liquid phase, chilling the diluted oil to cause the wax to be thrown out of solution, and subsequently separating the wax from said diluted oil.

8. The process of dewaxing a viscous mineral oil comprising diluting the oil with dichloro-difluoro-methane, said dilution being effected under pressure sufficient to maintain the diluent in liquid phase, chilling the diluted oil to a dewaxing temperature whereby the wax is substantially all crystallized from the diluted oil, separating said wax from said diluted oil, and subsequently separating the remaining diluent from the oil.

9. The process of dewaxing a viscous mineral oil comprising diluting the wax with a diluent containing dichloro-difluoro-methane, said dilution being effected under pressure sufficient to maintain the diluent in liquid phase, chilling the diluted oil to cause the wax to be thrown out of solution, and subsequently separating the wax from said diluted oil.

10. The process of dewaxing a viscous mineral oil comprising diluting said oil with a diluent selected from the class consisting of the chlorine and fluorine derivatives of methane having boiling-points below about $-20°$ C., said dilution being effected under pressure sufficient to maintain the diluent in liquid phase, chilling the diluted oil to a dewaxing temperature whereby the wax is substantially all crystallized from the diluted oil, and separating said wax from said diluted oil.

11. The process of dewaxing a viscous mineral oil comprising diluting the oil with methyl chloride, said dilution being effected under pressure sufficient to maintain the diluent in liquid phase, chilling the diluted oil to a dewaxing temperature whereby the wax is substantially all crystallized from the diluted oil, separating said wax from said diluted oil, and subsequently separating the remaining diluent from the oil.

HANS RAMSER.